(12) United States Patent
Chen et al.

(10) Patent No.: US 10,194,061 B2
(45) Date of Patent: Jan. 29, 2019

(54) PAN-TILT-ZOOM CAMERA AND UNMANNED AERIAL VEHICLE

(71) Applicant: Shenzhen Hubsan Technology Co., Ltd., Shenzhen (CN)

(72) Inventors: Guangyao Chen, Shenzhen (CN); Fanli Pang, Shenzhen (CN); Shenglong Liu, Shenzhen (CN)

(73) Assignee: SHENZHEN HUBSAN TECHNOLOGY CO., LTD., Shenzhen (CN)

( * ) Notice: Subject to any disclaimer, the term of this patent is extended or adjusted under 35 U.S.C. 154(b) by 69 days.

(21) Appl. No.: 15/648,519

(22) Filed: Jul. 13, 2017

(65) Prior Publication Data
US 2018/0359395 A1    Dec. 13, 2018

(30) Foreign Application Priority Data

Jun. 8, 2017   (CN) .......................... 2017 1 0427525

(51) Int. Cl.
*H04N 5/225* (2006.01)
*H04N 5/232* (2006.01)
*B64D 47/08* (2006.01)
*B64C 39/02* (2006.01)

(52) U.S. Cl.
CPC ......... *H04N 5/2253* (2013.01); *B64C 39/024* (2013.01); *B64D 47/08* (2013.01); *H04N 5/2254* (2013.01); *H04N 5/23264* (2013.01); *H04N 5/23296* (2013.01); *B64C 2201/127* (2013.01)

(58) Field of Classification Search
USPC ......................................................... 348/144
See application file for complete search history.

(56) References Cited

U.S. PATENT DOCUMENTS

| 2017/0261064 | A1* | 9/2017 | Liu | .................. B60R 11/04 |
| 2017/0264796 | A1* | 9/2017 | Tian | .................. B64D 47/08 |
| 2017/0307961 | A1* | 10/2017 | Tian | .................. B64C 39/024 |

* cited by examiner

*Primary Examiner* — Alexander Gee
(74) *Attorney, Agent, or Firm* — Na Xu; IPro, PLLC (57) ABSTRACT

The invention provides a pan-tilt-zoom (PTZ) camera, including a pan-tilt unit and a camera unit. The pan-tilt unit includes a first vibration damper plate, a second vibration damper plate, and a shock absorber ball; the camera unit is fixedly disposed on the first vibration damper plate, the shock absorber ball is sandwiched between the first vibration damper plate and the second vibration damper plate, and the shock absorber ball is fixedly connected to the second vibration damper plate; the shock absorber ball is elastic, and when the camera unit is horizontally laid, the first vibration damper plate is out of touch with the shock absorber ball; when the camera unit is subjected to extra load other than gravity, the first vibration damper plate compresses the shock absorber ball. The pan-tilt unit of the invention is simple in structure and safe in use. The camera unit is fixedly disposed on the first vibration damper plate, when the PTZ camera is subjected to extra load other than gravity, the shock absorber ball absorbs the shock, ensuring steady photographing of the PTZ camera, and exhibiting good vibration reducing performance.

10 Claims, 12 Drawing Sheets

PAN-TILT-ZOOM CAMERA AND UNMANNED AERIAL VEHICLE

FIELD OF THE INVENTION

The invention relates to the field of unmanned aerial vehicles, and more particularly to a pan-tilt-zoom (PTZ) camera and an unmanned aerial vehicle (UAV).

BACKGROUND OF THE INVENTION

Unmanned aerial vehicles, UAVs for short, are unmanned aircrafts controlled by radio remote equipment and self-contained program control devices. With advantages of small size, light weight, low costs, flexible operation, and high safety, UAVs are widely used for such fields as aerial photography, detection, search and rescue, resource exploration, and the like. However, during flying, UAVs are subjected to big shake and strong vibration. To ensure the quality of the aerial photo graph and protect the aerial equipment, a pan-tilt unit is employed to coordinate with the aerial equipment to improve the flight stability. Conventional pan-tilt units are complex in structure, large in size, and the shock absorber ball tends to loosen and fall off, causing the detachment of the pan-tilt units, which poses a hidden danger.

SUMMARY OF THE INVENTION

In view of the aforesaid problems, one objective of the present disclosure is to provide a pan-tilt-zoom (PTZ) camera that has compact structure, good vibration damping performance, and high use safety.

The objective of the present disclosure is achieved according to the following technical solutions.

In accordance with one embodiment of the present disclosure, there is provided a pan-tilt-zoom (PTZ) camera, comprising a pan-tilt unit and a camera unit, wherein the pan-tilt unit comprises a first vibration damper plate, a second vibration damper plate, and a shock absorber ball; the camera unit is fixedly disposed on the first vibration damper plate, the shock absorber ball is sandwiched between the first vibration damper plate and the second vibration damper plate, and the shock absorber ball is fixedly connected to the second vibration damper plate; the shock absorber ball is elastic, and when the camera unit is horizontally laid, the first vibration damper plate is out of touch with the shock absorber ball; when the camera unit is subjected to extra load other than gravity, the first vibration damper plate compresses the shock absorber ball.

As an improvement of the embodiment, the shock absorber ball comprises a mounting part, a connection part, and an elastic component; both the connection part and the elastic component are elastic; the connection part and the mounting part are fixedly connected, and the elastic component and the connection part are fixedly connected.

As an improvement of the embodiment, the second vibration damper plate comprises a mounting hole, and the mounting part is inserted into the mounting hole to fix the shock absorber ball on the second vibration damper plate.

As an improvement of the embodiment, the connection part is multiple in number; one end of each connection part is fixedly connected to the mounting part, and other ends of multiple connection parts are mutually fixedly connected to form a plane.

As an improvement of the embodiment, the elastic component is fixed on the plane, and a gap exists between the connection parts and the mounting part.

As an improvement of the embodiment, the elastic component and the connection parts are silica gel or rubber.

As an improvement of the embodiment, the pan-tilt unit further comprises a fixing part, when the camera unit is subjected to extra load other than gravity, one end of the fixing part is fixedly connected to the second vibration damper plate, and the other end of the fixing part butts against the first vibration damper plate; and the fixing part is configured to limit the first vibration damper plate.

As an improvement of the embodiment, the camera unit comprises:
a lens module;
a roll axis control module, being configured to fix and install the lens module, so as to allow the lens module to change postures along the roll axis;
a yaw axis control module, being configured to fix and install the roll axis control module, so as to allow the lens module and the roll axis control module to change postures along the yaw axis; and
a pitch axis control module, one end of the pitch axis control module being fixedly installed on the first vibration damper plate, the other end thereof being configured to fix and install the yaw axis control module, so as to allow the lens module, the roll axis control module, and the yaw axis control module to change postures along the pitch axis.

As an improvement of the embodiment, the roll axis control module, the yaw axis control module, and the pitch axis control module each comprise a drive motor and a support, the drive motor is used for posture changes, and the support is used for fixing and installation.

In another aspect, the present disclosure provides an unmanned aerial vehicle comprising a support part and the aforesaid pan-tilt-zoom camera, and the pan-tilt-zoom camera is mounted on the support part.

Advantages of the pan-tilt-zoom (PTZ) camera of the present disclosure are summarized as follow.

The pan-tilt unit comprises a first vibration damper plate, a second vibration damper plate, and a shock absorber ball sandwiched between the first vibration damper plate and the second vibration damper plate, thus simplifying the structure of the pan-tilt unit; the camera unit is fixedly disposed on the first vibration damper plate, when the PTZ camera is subjected to extra load other than gravity, the shock absorber ball absorbs the shock, ensuring steady photographing of the PTZ camera, and exhibiting good vibration reducing performance.

DETAILED DESCRIPTION OF THE EMBODIMENTS

To make the technical solutions of the present invention more clear and complete, the present invention will be described in more detail with accompanying drawings.

Figure 1:
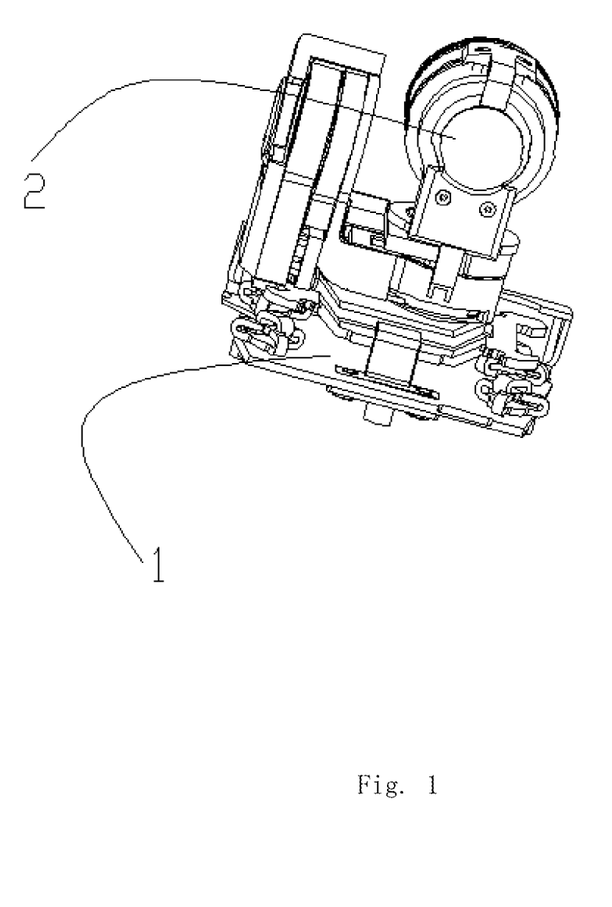
FIG. 1 is a schematic diagram of a pan-tilt-zoom (PTZ) camera according to one embodiment of the present disclosure.

As shown in FIG. 1, one embodiment provides an unmanned aerial vehicle comprising a support part and a pan-tilt-zoom (PTZ) camera mounted on the support part. The pan-tilt-zoom (PTZ) camera comprises a pan-tilt unit 1 and a camera unit 2.

Figure 2:
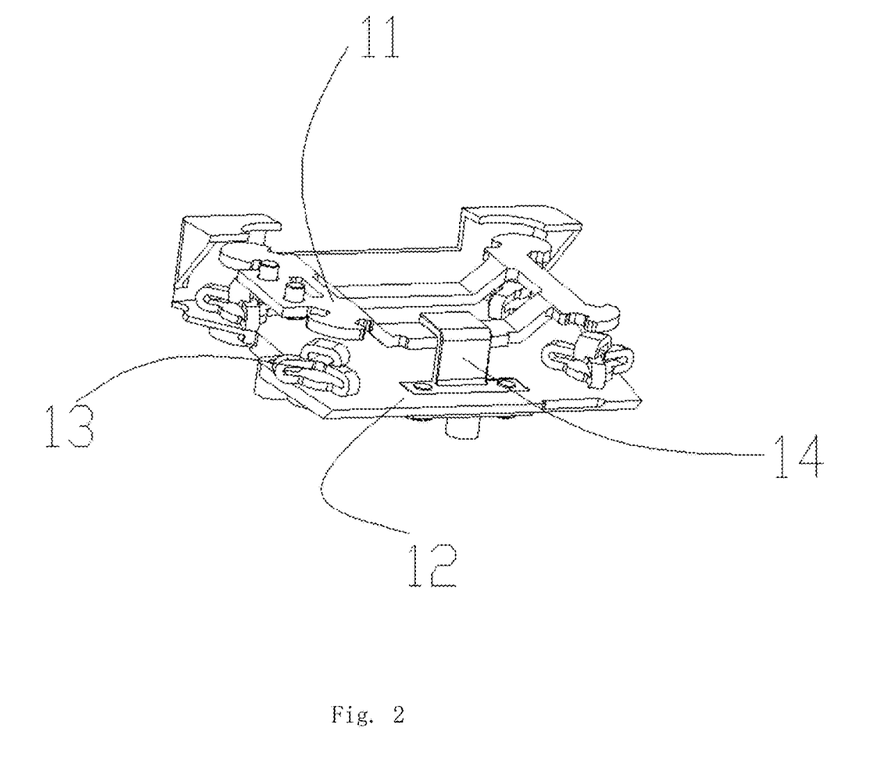
FIG. 2 is a schematic diagram of a pan-tilt unit according to one embodiment of the present disclosure.

Specifically, as shown in FIG. 2, the pan-tilt unit 1 comprises a first vibration damper plate 11, a second vibration damper plate 12, and a shock absorber ball 13; the camera unit 2 is fixedly disposed on the first vibration damper plate 11, the shock absorber ball 13 is sandwiched between the first vibration damper plate 11 and the second vibration damper plate 12, and the shock absorber ball 13 is fixedly connected to the second vibration damper plate 12; the shock absorber ball 13 is elastic, and when the camera unit 2 is horizontally laid, the first vibration damper plate 11 is out of touch with the shock absorber ball 13; when the camera unit 2 is subjected to extra load other than gravity, the first vibration damper plate 11 compresses the shock absorber ball 13.

In this embodiment, the camera unit 2 is fixedly disposed on the first vibration damper plate 11 by dispensing or using screws. Compared with other fixing modes, the fixing by means of dispensing or using screws narrows the occupied space of the fixing of the camera unit 2 and the first vibration damper plate 11, and it is safer and more reliable.

In this embodiment, because the camera unit 2 works in complex environments, and is often subjected to extra load other than gravity, so, during photographing, the camera unit 2 often sways, which causes the shot images to be disordered and fail to meet the requirement. In the present disclosure, the camera unit 2 is fixedly disposed on the first vibration damper plate 11, when the camera unit is subjected to extra load other than gravity, the PTZ camera transfers the extra load to the first vibration damper plate 11, and then the loaded first vibration damper plate 11 compresses the shock absorber ball 13. The shock absorber ball is elastic and can buffer the extra load, so the shock absorber ball absorbs the shock, ensuring the steady photographing of the PTZ camera.

In the embodiment, the shock absorber ball 13 is sandwiched between the first vibration damper plate 11 and the second vibration damper plate 12, so that the structure is simple, practical, not complicated, thus simplifying the pan-tilt unit 1.

Figure 4:
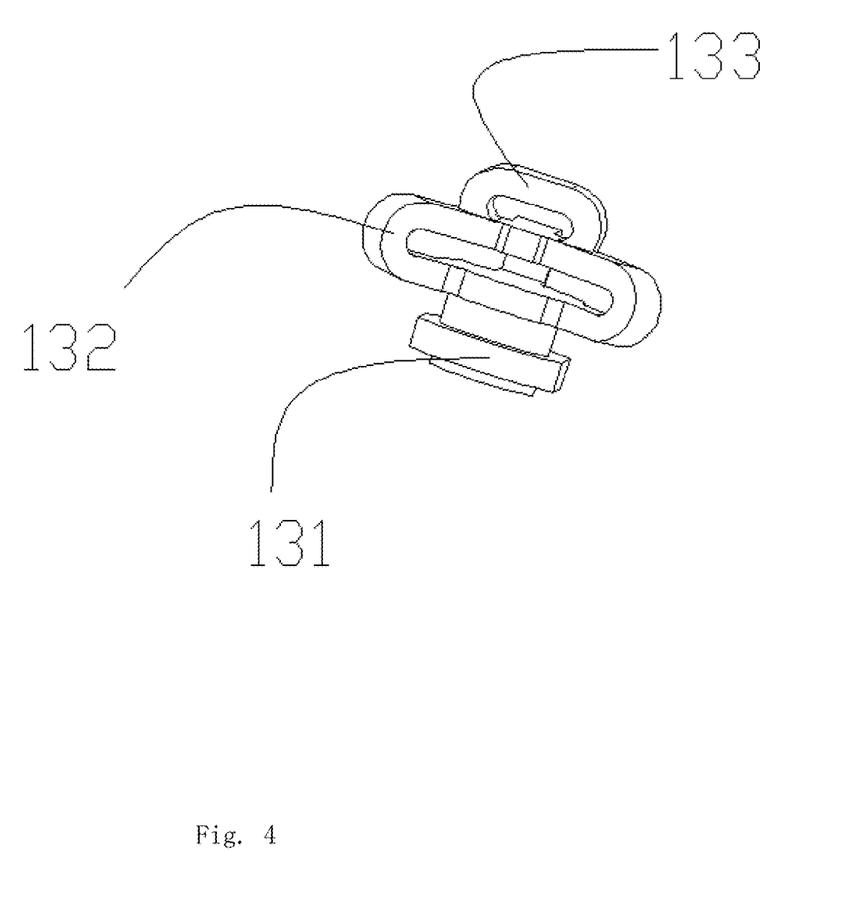
FIGS. 4-5 are schematic diagrams of a shock absorber ball according to one embodiment of the present disclosure.
Figure 5:
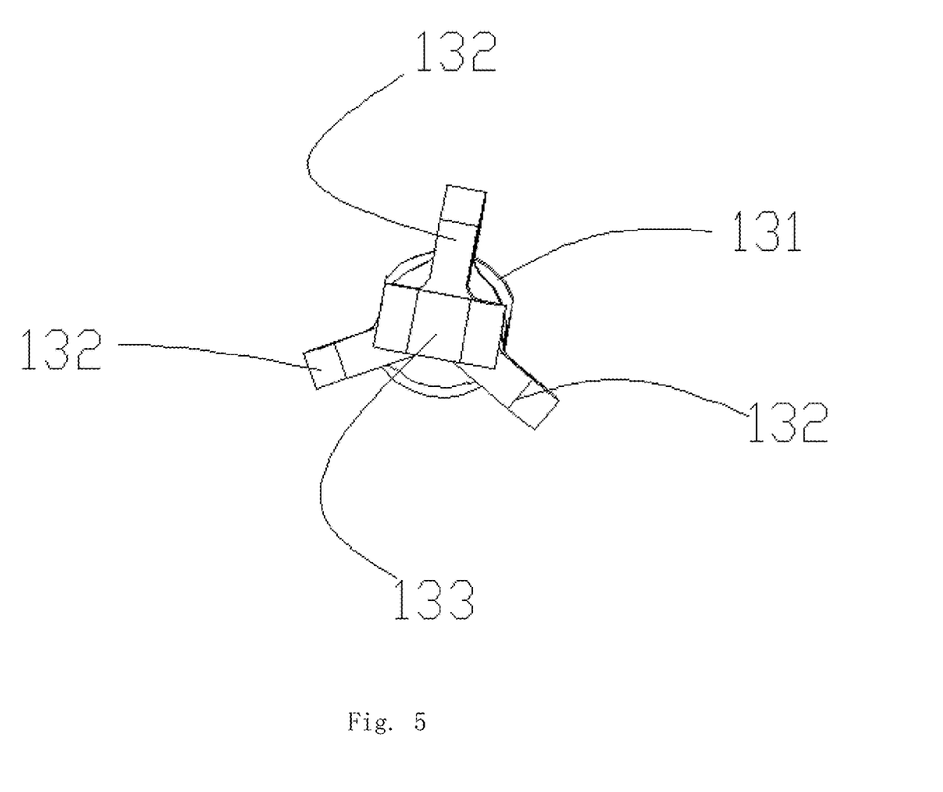

As shown in FIGS. 4-5, the shock absorber ball 13 comprises a mounting part 131, a connection part 132, and an elastic component 133; both the connection part 132 and the elastic component 133 are elastic; the connection part 132 and the mounting part 131 are fixedly connected, and the elastic component 133 and the connection part 132 are fixedly connected.

In the embodiment, four shock absorber balls 13 are provided. The mounting part 131 facilitates the installation of the shock absorber ball and the second vibration damper plate 12. The connection part 132 is disposed between the mounting part 131 and the elastic component 133. Both the connection part 132 and the elastic component 133 are elastic. The connection part 132 and the elastic component 133 form a second-level shock absorption unit, further improving the damping performance of the shock absorber ball 13. When the PTZ camera is subjected to extra load other than gravity, the connection part 132 and the elastic component 133 can effectively absorb the shock of the PTZ camera.

Figure 3:
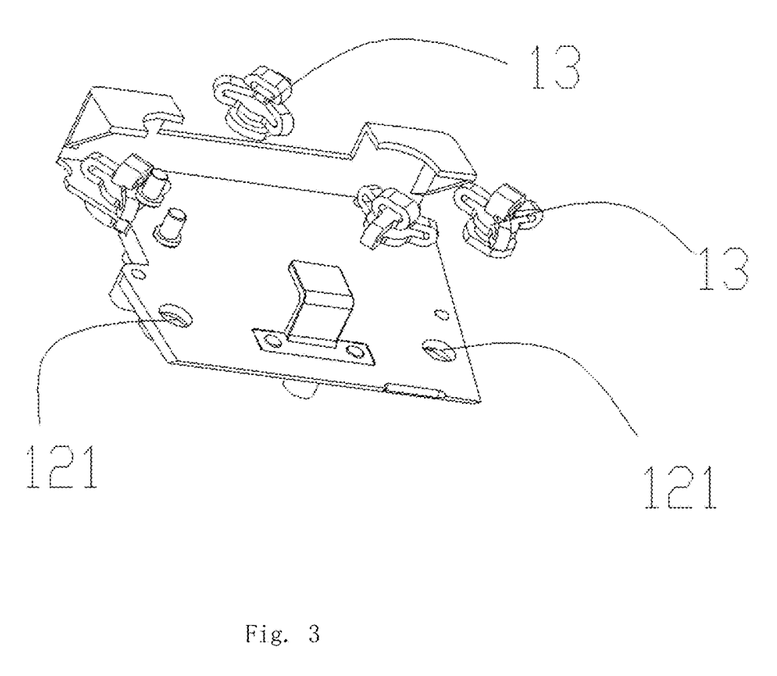
FIG. 3 is an exploded view of a pan-tilt unit according to one embodiment of the present disclosure.

Specifically, as shown in FIG. 3, the second vibration damper plate 12 comprises a mounting hole 121, and the mounting part 131 is inserted into the mounting hole 121 to fix the shock absorber ball 13 on the second vibration damper plate 12.

In the embodiment, four mounting holes 121 are provided, which are corresponding to the four shock absorber balls 13, the mounting part 131 is inserted into and tightly fits with the mounting holes 121, thus achieving the firm fixing without punching screw holes or locking the screws, enhancing the assembly efficiency of the shock absorber balls and the mounting holes.

Specifically, the connection part 132 is multiple in number; one end of each connection part 132 is fixedly connected to the mounting part 131, and other ends of the multiple connection parts 132 are mutually fixedly connected to form a plane 1321. The elastic component 133 is fixed on the plane 1321, and a gap exists between the multiple connection parts 132 and the mounting part 131. The elastic component 133 and the connection parts 132 are silica gel or rubber.

Specifically, there are three connection parts 132, every two connection parts 132 form an included angle of 120 degrees, which not only beautifies the connection parts 132, but also uniformizes the stress of the connection parts, thus further improving the damping performance of the connection parts 132. Ends of the three connection parts 132 are fixedly connected to the mounting part 131, the other ends of the three connection parts 132 are mutually fixedly connected to form a plane 1321, and the elastic components 133 are fixed on the plane 1321. The plane 1321 ensures the elastic components 133 to be horizontally positioned, when the PTZ camera is subjected to extra load other than gravity, the contact area between the horizontally positioned elastic components 133 and the first vibration damper plate 11 is enlarged, thus further enhancing the damping performance of the elastic components 133.

In this embodiment, the elastic components 133 are a hollow ellipse. The hollow structure of the elastic components 133 can provide sufficient compression space for the elastic components 133 even being compressed, thus further enhancing the damping performance of the elastic components 133.

In this embodiment, there is a gap between the three connection parts 132 and the mounting part 131. The gap can provide sufficient compression space for the connection parts 132 even being compressed, thus further enhancing the damping performance of the connection parts 132.

In this embodiment, the mounting part 131 is hard plastics, thus ensuring the firm fixing of the mounting part 131 and the mounting holes 121. The elastic component 133 and the connection parts 132 are soft materials. Specifically, the elastic component 133 and the connection parts 132 are silica gel or rubber, which endow the elastic component 133 and the connection parts 132 with good vibration reducing performance.

As an improvement, as shown in FIG. 3, the pan-tilt unit 1 further comprises a fixing part 14, when the camera unit is subjected to extra load other than gravity, one end of the fixing part 14 is fixedly connected to the second vibration damper plate 12, and the other end of the fixing part butts against the first vibration damper plate 11; and the fixing part 14 is configured to limit the first vibration damper plate 11.

In this embodiment, the fixing part 14 is disposed in the middle part of the second vibration damper plate 12, and the fixing part 14 and the second vibration damper plate 12 are fixed by locking screws; the fixing mode ensures the steady assembly of the fixing part 14 and the second vibration damper plate 12, and improves the assembly efficiency of the two elements, simplifying the structure.

In this embodiment, when the PTZ camera is only subjected to the gravity, the fixing part 14 is out of touch with the second vibration damper plate 12; when the PTZ camera is subjected to extra load other than gravity, the fixing part 14 butts against and limits the first vibration damper plate 11, thus preventing the detachment of the camera unit 2.

Figure 6:
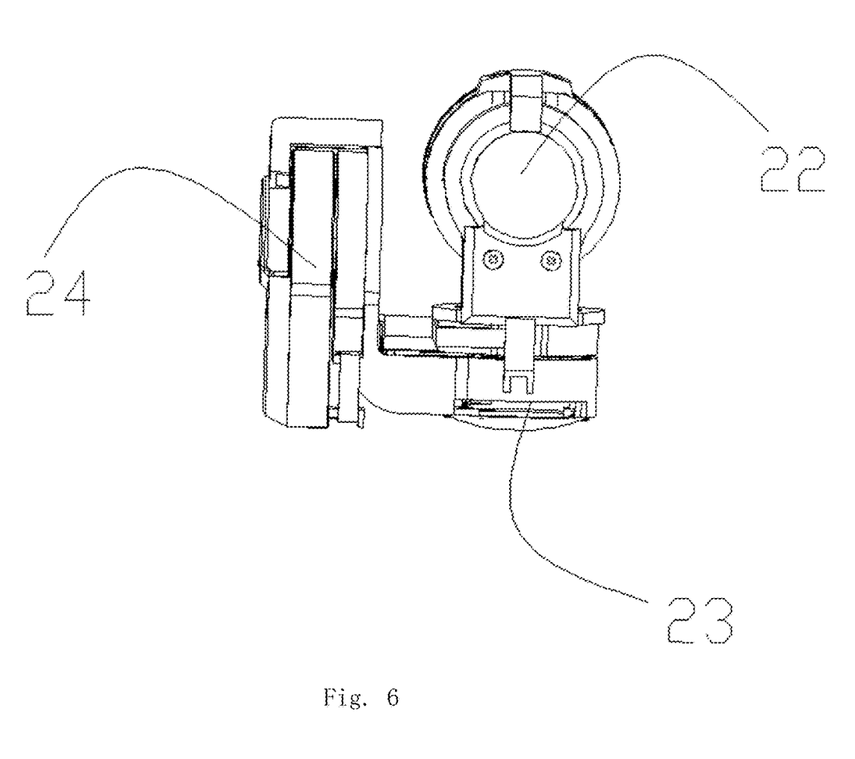
FIGS. 6-7 are schematic diagrams of a camera unit according to one embodiment of the present disclosure.
Figure 7:
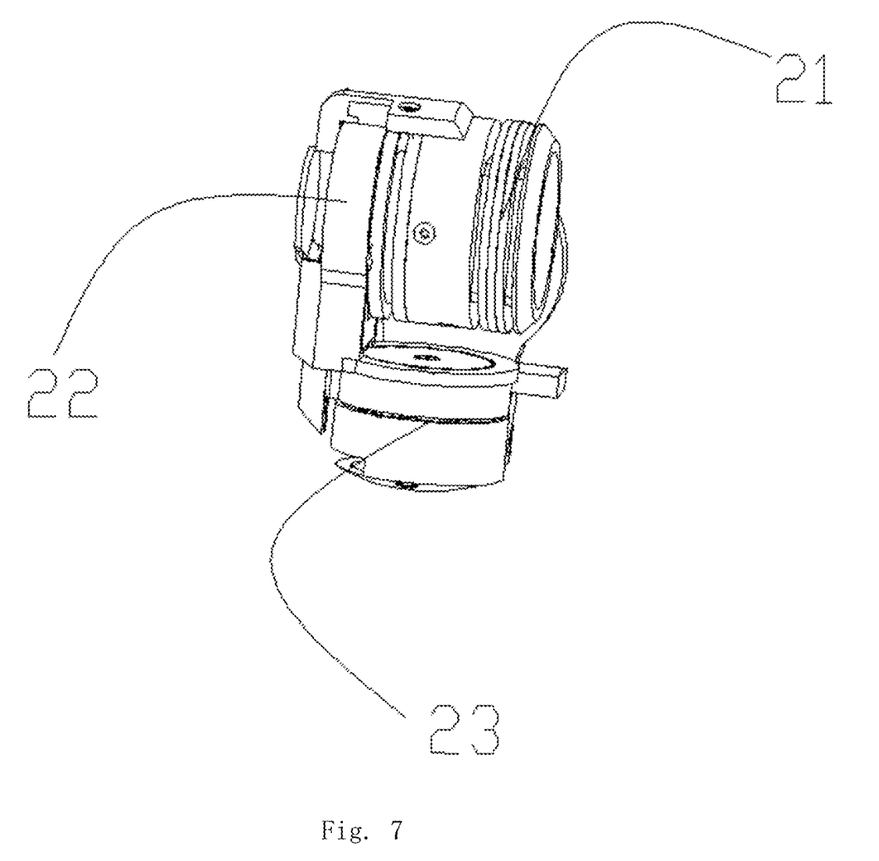
Figure 8A:
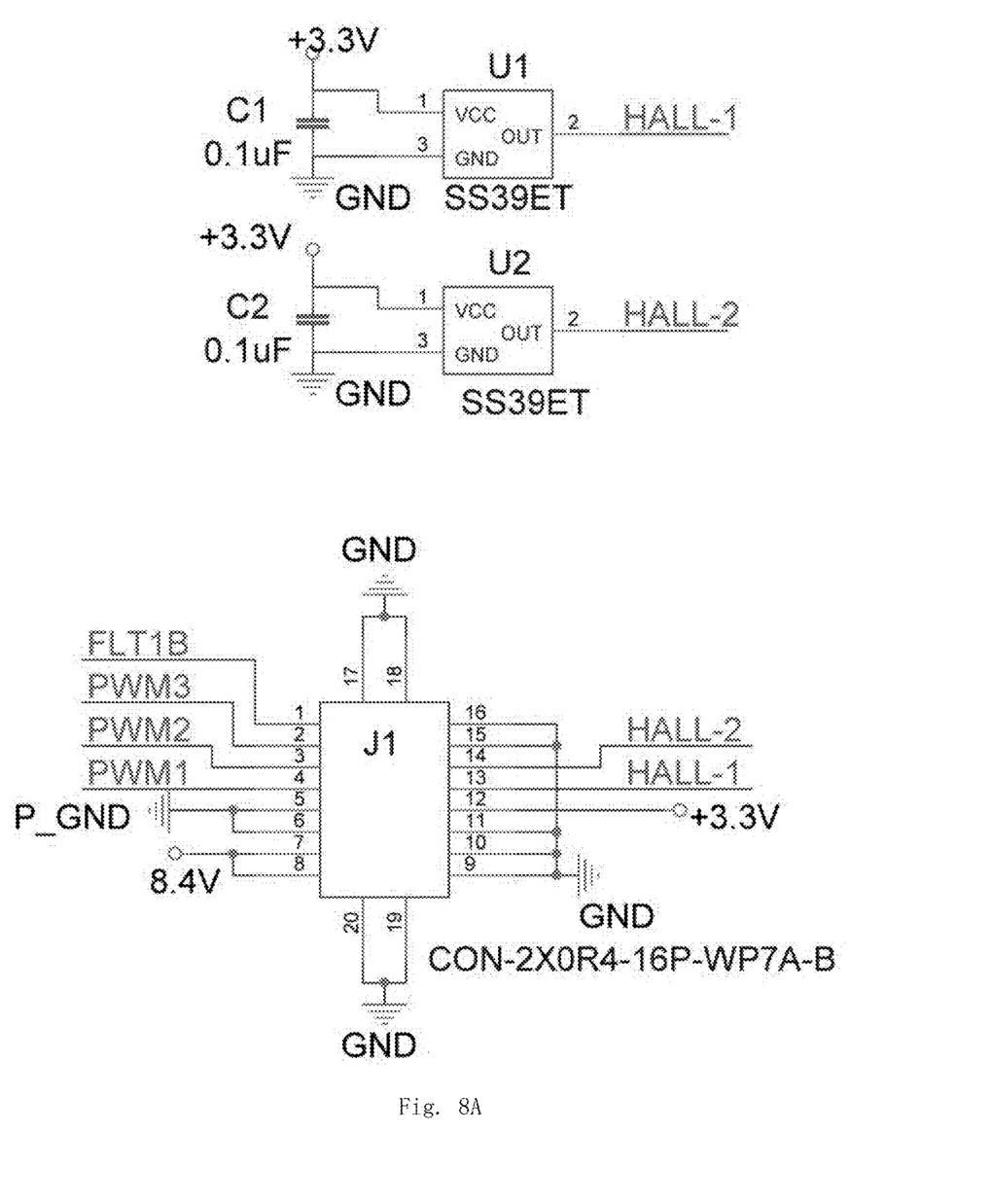
FIGS. 8A, 8B and FIGS. 9A, 9B, 9C are circuit principle diagrams of a pan-tilt-zoom (PTZ) camera according to one embodiment of the present disclosure.
Figure 8B:
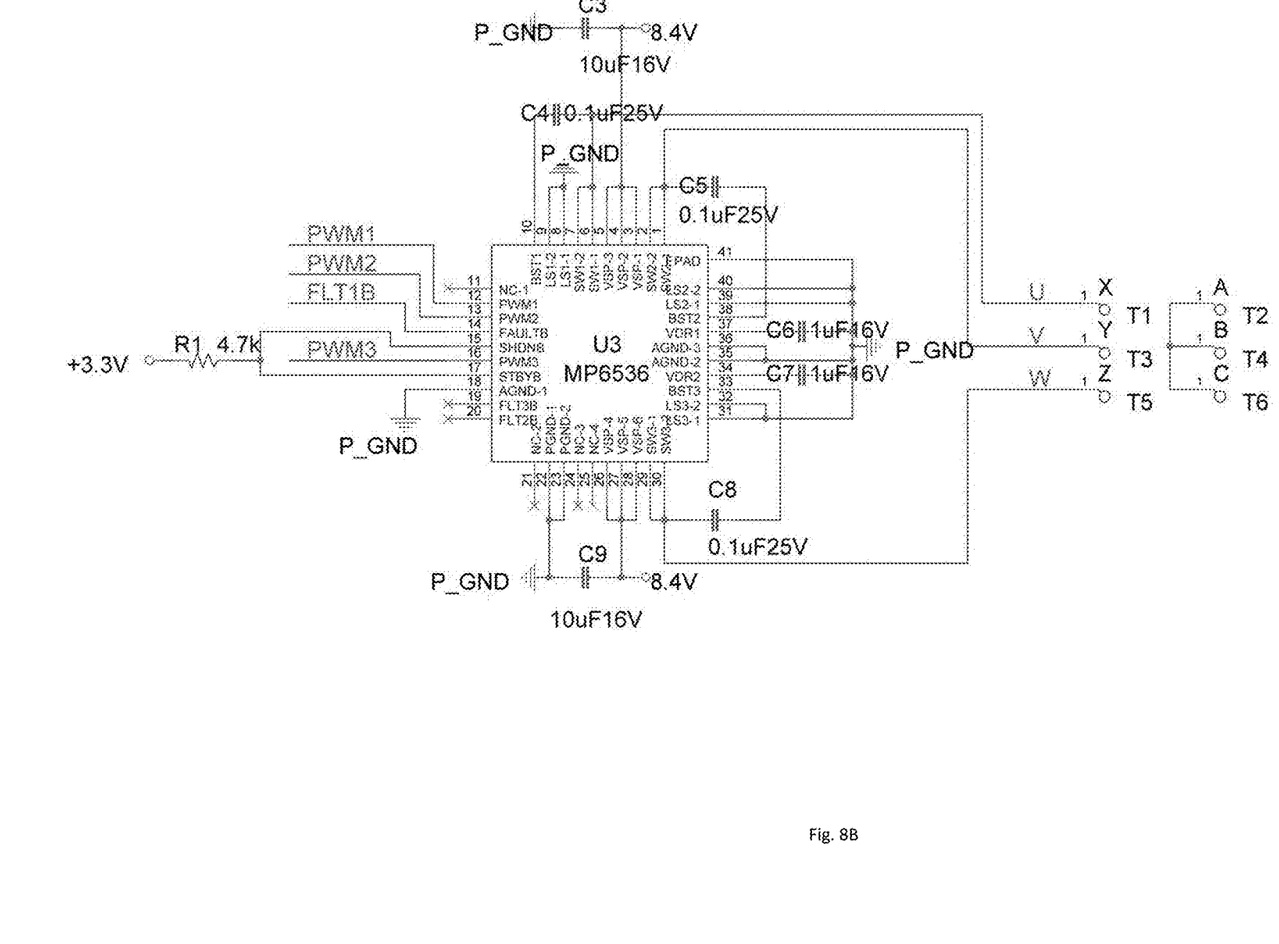
Figure 9A:
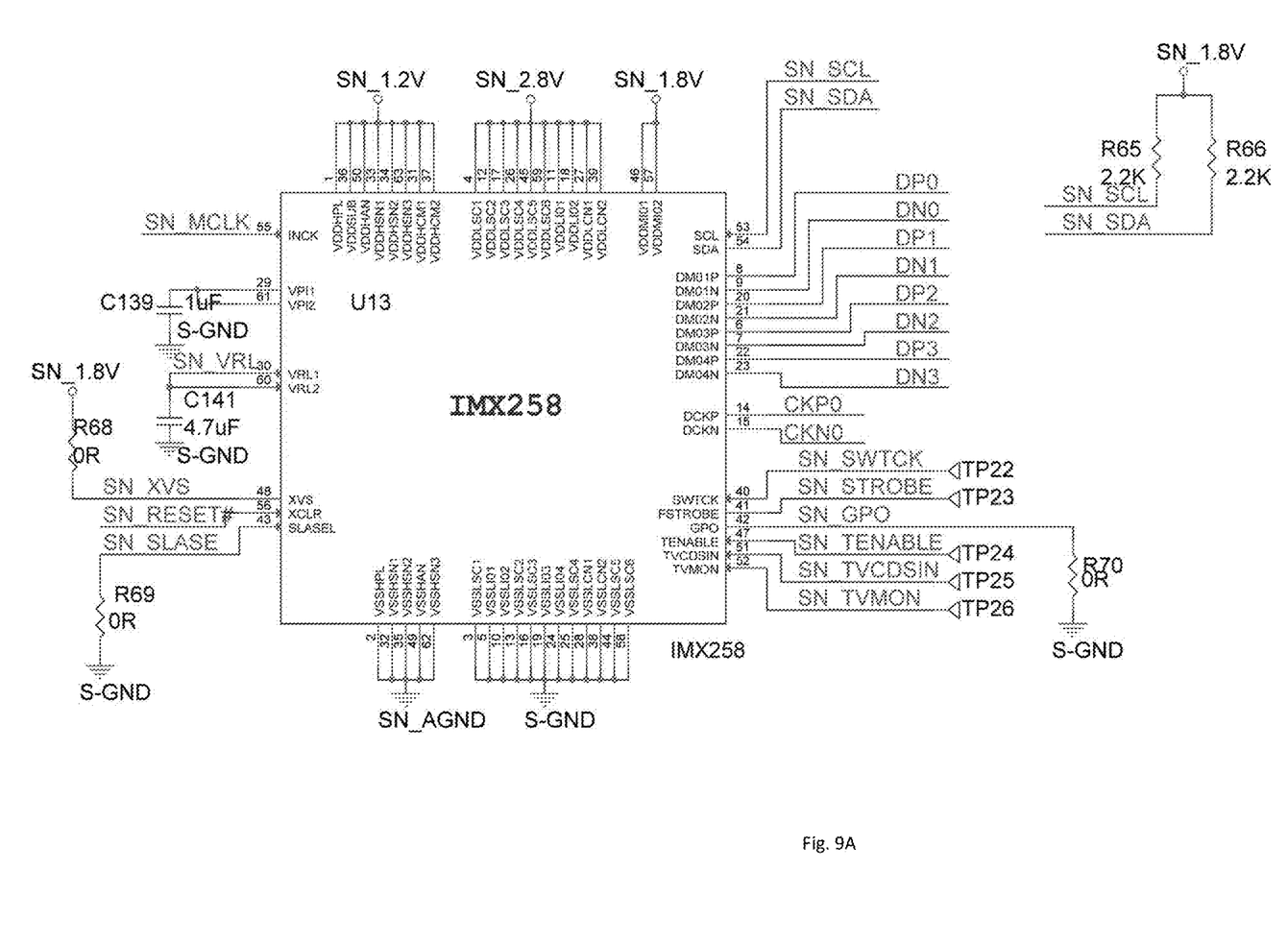
Figure 9B:
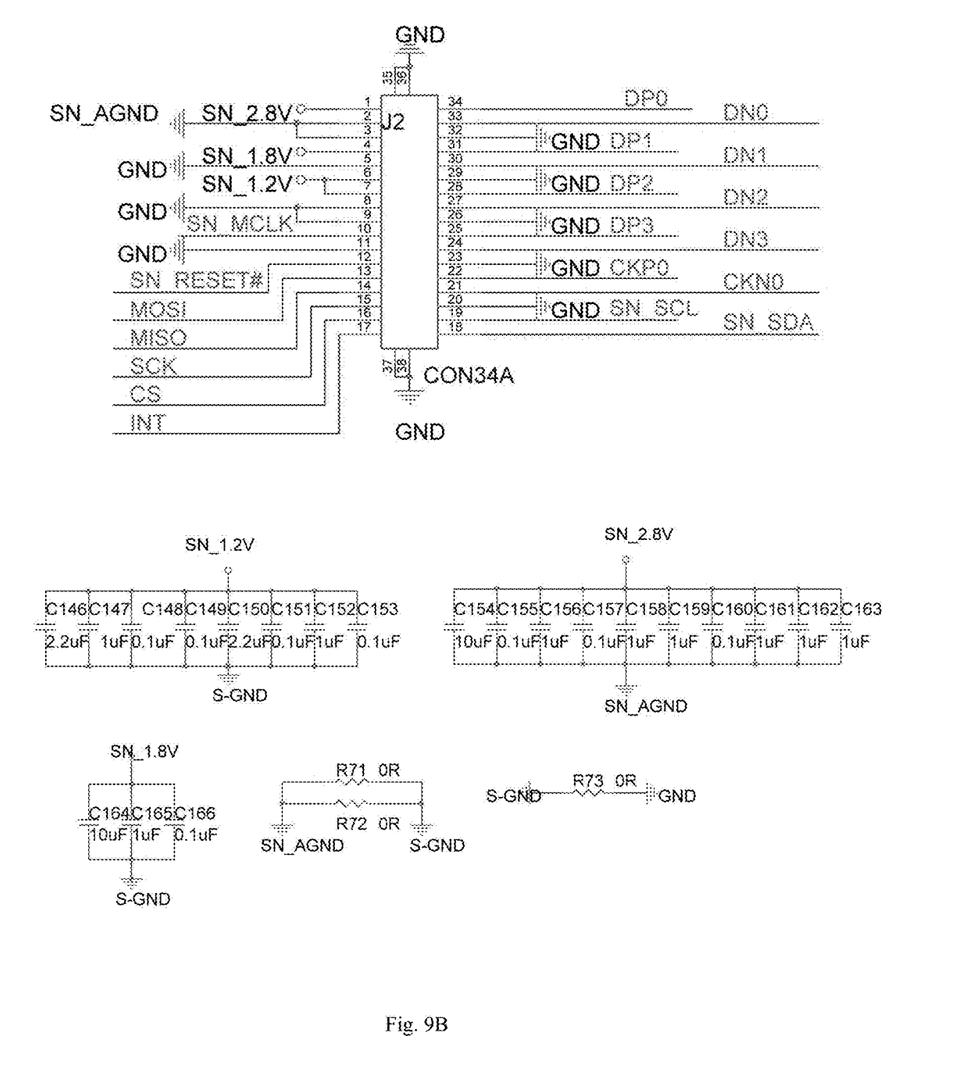
Figure 9C:
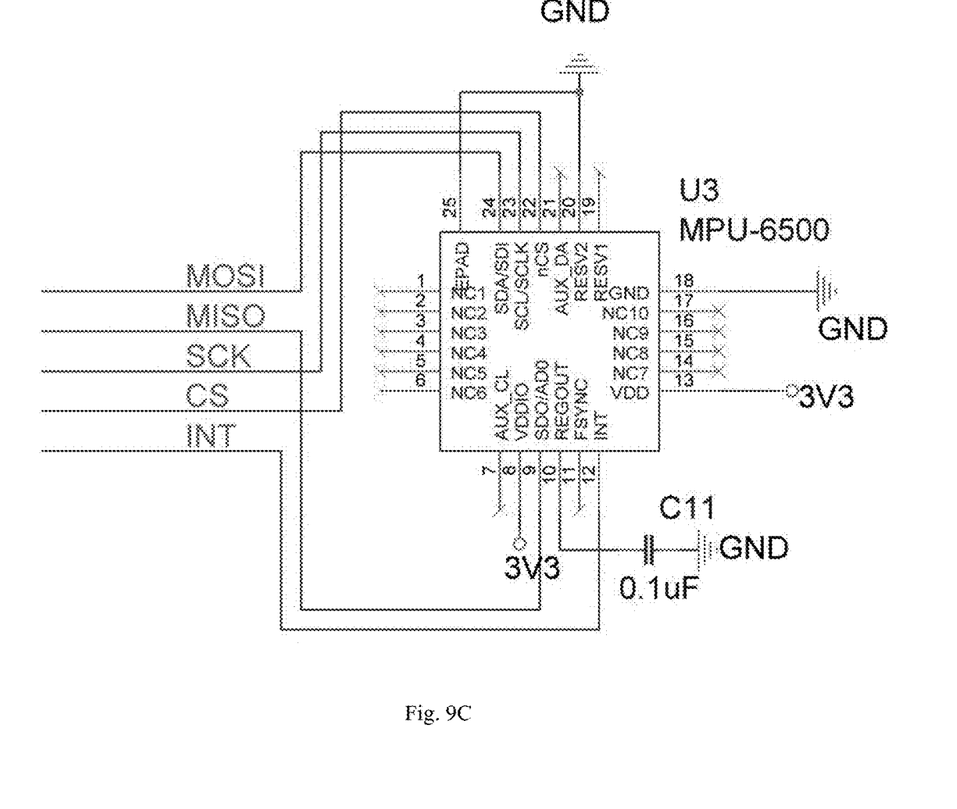

In this embodiment, as shown in FIGS. 6-7, the camera unit comprises a lens module 21, a roll axis control module 22, a yaw axis control module 23, and a pitch axis control module 24; the roll axis control module 22 is configured to fix and install the lens module 21 which is capable of changing postures along the roll axis; the yaw axis control module 23 is configured to fix and install the roll axis control module 22, so that the lens module 21 and the roll axis control module 22 are capable of changing postures along the yaw axis; one end of the pitch axis control module 24 is fixedly installed on the first vibration damper plate 11, the other end thereof is configured to fix and install the yaw axis control module 23, so that the lens module 21, the roll axis control module 22, and the yaw axis control module 23 are capable of changing postures along the pitch axis.

In this embodiment, the coordination and assembly of the roll axis control module 22, the yaw axis control module 23, and the pitch axis control module 24 to yield the camera unit 2, and the rotation of the camera unit 2 along the pitch axis, the roll axis, and the yaw axis can be controlled.

In this embodiment, the lens module 21 comprises an optical sensor module and a camera.

In this embodiment, the roll axis control module 22, the yaw axis control module 23, and the pitch axis control module 24 each comprise a drive motor 241 and a support 242, the drive motor 241 is used for posture changes, and the support 242 is used for fixing and installation.

In this embodiment, the drive motor 241 comprises a shell which is configured to protect, support and fix the drive motor 241. The connection of the support 242 and the shell of the drive motor 241 makes the support 242 and the drive motor 241 fixed and installed.

In this embodiment, the rotation of the drive motor 241 enables the roll axis control module 22, the yaw axis control module 23, and the pitch axis control module 24 to achieve corresponding posture changes.

In this embodiment, as shown in FIGS. 8A-8B, and FIG. 9A-9C, the support 242 further comprises control modules of the drive motors 241, each control module is corresponding to a drive circuit of each drive motor 241, each drive circuit is located in the lens module 21 and connected to the control modules, so as to control the drive motor 241 to change the posture of the pan-tilt unit 1 according to control commands.

In this embodiment, the lens module 21 comprises a gyroscope and CPU, the gyroscope gathers the posture changes of the PTZ camera, generates and inputs corresponding commands to the CPU, and the CPU receives and examines the commands to instruct the PTZ camera to work properly.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A pan-tilt-zoom (PTZ) camera, characterized by comprising a pan-tilt unit and a camera unit, wherein the pan-tilt unit comprises a first vibration damper plate, a second vibration damper plate, and a shock absorber ball; the camera unit is fixedly disposed on the first vibration damper plate, the shock absorber ball is sandwiched between the first vibration damper plate and the second vibration damper plate, and the shock absorber ball is fixedly connected to the second vibration damper plate; the shock absorber ball is elastic, and when the camera unit is horizontally laid, the first vibration damper plate is out of touch with the shock absorber ball; when the camera unit is subjected to extra load other than gravity, the first vibration damper plate compresses the shock absorber ball.

2. The camera of claim 1, wherein the shock absorber ball comprises a mounting part, a connection part, and an elastic component; both the connection part and the elastic component are elastic; the connection part and the mounting part are fixedly connected, and the elastic component and the connection part are fixedly connected.

3. The camera of claim 2, wherein the second vibration damper plate comprises a mounting hole, and the mounting part is inserted into the mounting hole to fix the shock absorber ball on the second vibration damper plate.

4. The camera of claim 2, wherein the connection part is multiple in number, one end of each connection part is fixedly connected to the mounting part, and other ends of multiple connection parts are mutually fixedly connected to form a plane.

5. The camera of claim 4, wherein the elastic component is fixed on the plane, and a gap exists between the connection parts and the mounting part.

6. The camera of claim 4, wherein the elastic component and the connection parts are silica gel or rubber.

7. The camera of claim 1, wherein the pan-tilt unit further comprises a fixing part, when the camera unit is subjected to extra load other than gravity, one end of the fixing part is fixedly connected to the second vibration damper plate, and the other end of the fixing part butts against the first vibration damper plate;

and the fixing part is configured to limit the first vibration damper plate.

8. The camera of claim 1, wherein the camera unit comprises:
a lens module;
a roll axis control module, being configured to fix and install the lens module, so as to allow the lens module to change postures along the roll axis;
a yaw axis control module, being configured to fix and install the roll axis control module, so as to allow the lens module and the roll axis control module to change postures along the yaw axis; and
a pitch axis control module, one end of the pitch axis control module being fixedly installed on the first vibration damper plate, the other end thereof being configured to fix and install the yaw axis control module, so as to allow the lens module, the roll axis control module, and the yaw axis control module to change postures along the pitch axis.

9. The camera of claim 8, wherein the roll axis control module, the yaw axis control module, and the pitch axis control module each comprise a drive motor and a support, the drive motor is used for posture changes, and the support is used for fixing and installation.

10. An unmanned aerial vehicle, comprising a support part and a pan-tilt-zoom camera of claims 1, the pan-tilt-zoom camera being mounted on the support part.

* * * * *